United States Patent
El-Sallabi et al.

(10) Patent No.: US 9,819,081 B2
(45) Date of Patent: Nov. 14, 2017

(54) RECONFIGURABLE RADIO DIRECTION FINDER SYSTEM AND METHOD

(71) Applicants: Hassan Mohamed El-Sallabi, Doha (QA); Mohamed Mahmoud Abdallah, Doha (QA); Khalid Ali Qaraqe, Doha (QA); Gregory H. Huff, College Station, TX (US); Jean-Francois Chamberland-Tremblay, College Station, TX (US)

(72) Inventors: Hassan Mohamed El-Sallabi, Doha (QA); Mohamed Mahmoud Abdallah, Doha (QA); Khalid Ali Qaraqe, Doha (QA); Gregory H. Huff, College Station, TX (US); Jean-Francois Chamberland-Tremblay, College Station, TX (US)

(73) Assignee: QATAR FOUNDATION FOR EDUCATION, SCIENCE AND COMMINITY DEVELOPMENT, Doha (QA)

( * ) Notice: Subject to any disclaimer, the term of this patent is extended or adjusted under 35 U.S.C. 154(b) by 649 days.

(21) Appl. No.: 14/325,300

(22) Filed: Jul. 7, 2014

(65) Prior Publication Data
US 2016/0006121 A1    Jan. 7, 2016

(51) Int. Cl.
*G01S 5/04* (2006.01)
*H01Q 3/24* (2006.01)
(Continued)

(52) U.S. Cl.
CPC ............. *H01Q 3/24* (2013.01); *G01S 3/14* (2013.01); *G01S 3/38* (2013.01); *G01S 3/72* (2013.01); *H01Q 21/065* (2013.01)

(58) Field of Classification Search
CPC .......... H01Q 3/24; H01Q 21/065; G01S 3/14; G01S 3/38; G01S 3/72
(Continued)

(56) References Cited

U.S. PATENT DOCUMENTS

| 5,402,132 A | 3/1995 | Hall et al. |
| 6,198,438 B1 * | 3/2001 | Herd ............... H01Q 3/247 343/700 MS |

(Continued)

FOREIGN PATENT DOCUMENTS

| CN | 1452270 A | 10/2003 |
| CN | 1287487 C | 11/2006 |

(Continued)

OTHER PUBLICATIONS

International Preliminary Report on Patentability, PCT/US2015/039298, dated Jan. 10, 2017.*

*Primary Examiner* — Frank J McGue
(74) *Attorney, Agent, or Firm* — Richard C. Litman

(57) ABSTRACT

The reconfigurable radio direction finder system and method uses a reconfigurable antenna to electronically cycle through a plurality of different antenna configurations to determine a signal direction. Specifically, the reconfigurable antenna is cycled through N different antenna configurations, where N is an integer greater than one, where each antenna configuration has a pointing direction associated therewith defined by an elevation angle $\theta_n$ of an n-th antenna configuration, where n is an integer between 1 and N, and an azimuthal angle $\phi_n$ of the n-th antenna configuration. A received signal strength of the radio signal is measured for each of the antenna configurations as a power output of the n-th antenna configuration, $P_n$. A spherical weighted directional mean vector ($X_{DF}$, $Y_{DF}$, $Z_{DF}$) is then estimated for the radio signal as (Continued)

$$X_{DF} = \frac{1}{N} \sum_{n=1}^{N} P_n \cos(\phi_n) \sin(\theta_n),$$

$$Y_{DF} = \frac{1}{N} \sum_{n=1}^{N} P_n \sin(\phi_n) \sin(\theta_n) \text{ and}$$

$$Z_{DF} = \frac{1}{N} \sum_{n=1}^{N} P_n \sin(\theta_n).$$

4 Claims, 6 Drawing Sheets

(51) Int. Cl.
- *G01S 3/38* (2006.01)
- *H01Q 21/06* (2006.01)
- *G01S 3/14* (2006.01)
- *G01S 3/72* (2006.01)

(58) Field of Classification Search
USPC ........................................................ 342/443
See application file for complete search history.

(56) References Cited

U.S. PATENT DOCUMENTS

| | | |
|---|---|---|
| 6,816,116 B2 | 11/2004 | Chen |
| 7,403,172 B2 | 7/2008 | Cheng |
| 7,577,464 B2 | 8/2009 | Ezal et al. |
| 7,589,674 B2 | 9/2009 | Anagnostou et al. |
| 8,305,265 B2 | 11/2012 | Ezal et al. |
| 8,369,796 B2 | 2/2013 | Pan et al. |
| 8,581,783 B2 | 11/2013 | Higgins |
| 2002/0173268 A1* | 11/2002 | Heinzmann .......... H01Q 9/0407 455/3.05 |
| 2003/0179138 A1* | 9/2003 | Chen .................... G06F 1/1616 342/372 |
| 2009/0146895 A1* | 6/2009 | Drexler ................... H01Q 3/24 343/757 |
| 2011/0273347 A1* | 11/2011 | Wilkins ............... H01Q 21/065 343/749 |
| 2013/0249761 A1 | 9/2013 | Loh et al. |

FOREIGN PATENT DOCUMENTS

| | | |
|---|---|---|
| CN | 103091661 A | 5/2013 |
| EP | 2568529 A1 | 3/2013 |
| GB | 2493561 A | 2/2013 |

\* cited by examiner

RECONFIGURABLE RADIO DIRECTION FINDER SYSTEM AND METHOD

BACKGROUND OF THE INVENTION

Field of the Invention

The present invention relates to direction finding of radio frequency signals, and particularly to a system and method utilizing a reconfigurable antenna to estimate signal direction.

Description of the Related Art

Conventional radio direction finder systems are typically phased array systems. Phased antenna array systems are based on a fixed antenna pattern of each antenna element in the antenna array. Arriving signals from different antennas are weighted to create proper beam forming in the direction of arrival. A phased array depends on the antenna geometry and whether the particular antenna array can estimate both angles (i.e., azimuth and elevation). For example, a horizontal linear array can be used to estimate the azimuth angles but not the vertical angles, and the reverse is true for a vertical linear array. The planar, circular, spherical or alike antenna array configurations may measure both the azimuth and vertical angles. The size of conventional phased antenna array depends on the operating frequency of the signal of interest, since the spacing between antenna elements is related to the wavelength of the operating frequency. Direction finding over a wide operating frequency range requires different sizes of antenna arrays, which is typically not convenient due to the actual physical implementation of such systems and/or degradation in performance if proper requirements between antenna space and the wavelength of the operation frequency are not met.

Conventional antennae typically have a fixed radiation pattern at a specific operating frequency and bandwidth. Reconfigurable antennae, however, have the capability of dynamically changing their characteristics, such as radiation pattern, polarization and operating frequency. The reconfiguration of such antennae can be achieved via different techniques, such as altering the physical structure of the antenna, altering feeding methods, controlling current density and the like. Ultimately, the choice of reconfiguration method is based on the design requirements and performance level required. The distribution of current in an antenna and its geometry determines how the antenna radiates its energy into a radio channel, or how it receives radio frequency energy from it. The complex far field radiation pattern of an antenna can be mathematically expressed as:

$$F(\theta,\phi) = \hat{r} \times [\hat{r} \times [\int_V J_V(r') e^{-j\beta \hat{r} \cdot r'} dv]], \quad (1)$$

where $F(\theta,\phi) = (F_\theta(\theta,\phi), F_\phi(\theta,\phi)) \in C^{2 \times 1}$, $J_V(r')$ is the current distribution in the antenna, $\hat{r}$ is the unit vector in the direction of propagation to an observation point, and $r'$ is a vector from the coordinate system's origin to any point on the antenna.

From equation (1), it can be seen that by changing the antenna's physical configuration $r'$, the current distribution $J_V(r')$ will change, which is reflected by altering the complex far field radiation pattern $F(\theta, \phi)$. Thus, controlling distribution of the current in the antenna, $J_V(r')$, leads to control of the radiation pattern $F(\theta, \phi)$. Thus, the overall goal in using a reconfigurable antenna is to control change of the current distribution around the antenna, which leads to altering the radiated far field. Such changes can be achieved by modification of the antenna geometry or its material properties.

The implementation of reconfigurable antennae can be accomplished in three different processes, namely a design stage, a simulation stage, and an optimization stage. The antenna design stage includes selection of the radiating structure of the antenna and its reconfigurable aspects. The selection process is based on several performance parameters, such as power consumption, directivity, bandwidth operating frequency and the like, in addition to design constraints, such as antenna size, fabrication costs, etc. These antenna performance parameters have to be fulfilled for every antenna state to ensure that the reconfigurable antenna can work as expected when it switches from one antenna state to another.

One antenna structure that is known for its versatility in many applications is the patch antenna. These antennae can be very small in size, making them attractive for numerous applications, since they can be arranged in different geometries (rectangular, circular, dipoles, etc.). The selected geometry depends on application and performance parameters. Patch antennae can be used in arrays to adapt to different radiation patterns, polarization and operating frequency, thus making them desirable for use in reconfigurable antennae.

Following selection of antenna structure, it is important to select the choice of reconfiguration; i.e., how reconfiguration will take place. Antenna reconfigurability can be categorized into four different reconfigurability functions, namely 1) reconfiguring resonance frequency, which usually takes place by changing physical properties that alter surface current distribution; 2) reconfiguring radiation pattern, which usually takes place by changing radiating edges, slots, or the feeding network; 3) reconfiguring polarization state, which usually takes place via changing the surface structure or the feeding network; and 4) combinations of reconfiguring the above characteristics, which usually takes place by using numerous techniques simultaneously. It is very difficult to configure frequency, radiation pattern and polarization independent of one another, as changing one characteristic will change the others. Thus, careful design and analysis are very important. As such, it would be desirable to be able to use the fourth reconfiguration function; i.e., combination of multiple techniques, such as simultaneously.

With regard to signals and antennae, the field of direction finding involves measuring and evaluating signal strength to find the line of bearing from a signal source to the direction finding system (commonly referred to as the "angle of arrival"). The direction of arrival of signal propagation from a radio source can be defined by two angles: the azimuthal angle and the elevation angle. The azimuthal angle is typically measured relative to North, although other reference directions may be used. The elevation angle can be measured relative to the horizon or the z-axis relative to the coordinate frame of the direction finding device.

Thus, a reconfigurable radio direction finder system and method of using the same addressing the aforementioned problems is desired.

SUMMARY OF THE INVENTION

The reconfigurable radio direction finder system and method uses a reconfigurable antenna to cycle electronically through a plurality of different reconfigurable antenna radiation patterns to determine a signal direction. Specifically, a reconfigurable antenna design of N different current paths, $r'_1, r'_2, \ldots, r'_N$, generates N distributed current distributions, $J(r'_1), \ldots, J(r'_N)$. Thus, the reconfigurable antenna design is capable of radiating N different radiation antenna patterns, $F^1(\theta, \phi), \ldots, F^N(\theta, \phi)$ that correspond to the N current distributions. $J(r'_n)$ and $F^n(\theta, \phi)$ are the $n^{th}$ current distribution and $n^{th}$ radiation pattern, respectively, which correspond to an antenna radiation state (i.e., an "antenna state" or "antenna configuration") of the reconfigurable antenna, where n is an integer between 1 and N.

The reconfigurable antenna is cycled electronically, using different combinations of ON-OFF antenna switches of the reconfigurable antenna, through N different radiation patterns, where N is an integer greater than one, where each antenna configuration has a pointing direction $(\theta_n, \phi_n)$ associated therewith defined by an elevation angle $\theta_n$ of an n-th antenna configuration, and an azimuthal angle $\phi_n$ of the n-th antenna configuration. A received signal strength of the radio signal is measured for each of the antenna configurations as a power output of the n-th antenna configuration, $P_n$, based on calibration of the receiver system. A spherical weighted directional mean vector $(X_{DF}, Y_{DF}, Z_{DF})$ is then estimated for the radio signal as $$X_{DF} = \frac{1}{N} \sum_{n=1}^{N} P_n \cos(\phi_n) \sin(\theta_n),$$

$$Y_{DF} = \frac{1}{N} \sum_{n=1}^{N} P_n \sin(\phi_n) \sin(\theta_n) \text{ and}$$

$$Z_{DF} = \frac{1}{N} \sum_{n=1}^{N} P_n \sin(\theta_n).$$

An estimated elevation angle $\Xi_{DF}$ and an estimated azimuthal angle $\Phi_{DF}$ of the radio signal can be calculated or determined as $$\Xi_{DF} = \cos^{-1}\left(\frac{Z_{DF}}{\sqrt{X_{DF}^2 + Y_{DF}^2 + Z_{DF}^2}}\right) \text{ and } \Phi_{DF} = \tan^{-1}\left(\frac{Y_{DF}}{X_{DF}}\right).$$

The reconfigurable antenna can be formed as a substrate having a planar array of patch antennae mounted thereon, where the planar array of patch antennae are arrayed in a rectangular grid having horizontal rows and vertical columns. A plurality of switches connects each of the patch antennae to horizontally and vertically adjacent ones of the patch antennae to form the reconfigurable antenna. In use, individual ones of the plurality of switches can be selectively opened and closed to form a desired antenna configuration of the reconfigurable antenna that defines a particular current distribution, $J(r'_n)$, of antenna radiation state n. The switches can be micro-electromechanical switches, radio frequency field effect transistor switches or the like.

These and other features of the present invention will become readily apparent upon further review of the following specification and drawings.

BRIEF DESCRIPTION OF THE DRAWINGS

Unless otherwise indicated, similar reference characters denote corresponding features consistently throughout the attached drawings.

DETAILED DESCRIPTION OF THE PREFERRED EMBODIMENTS

Figure 1:
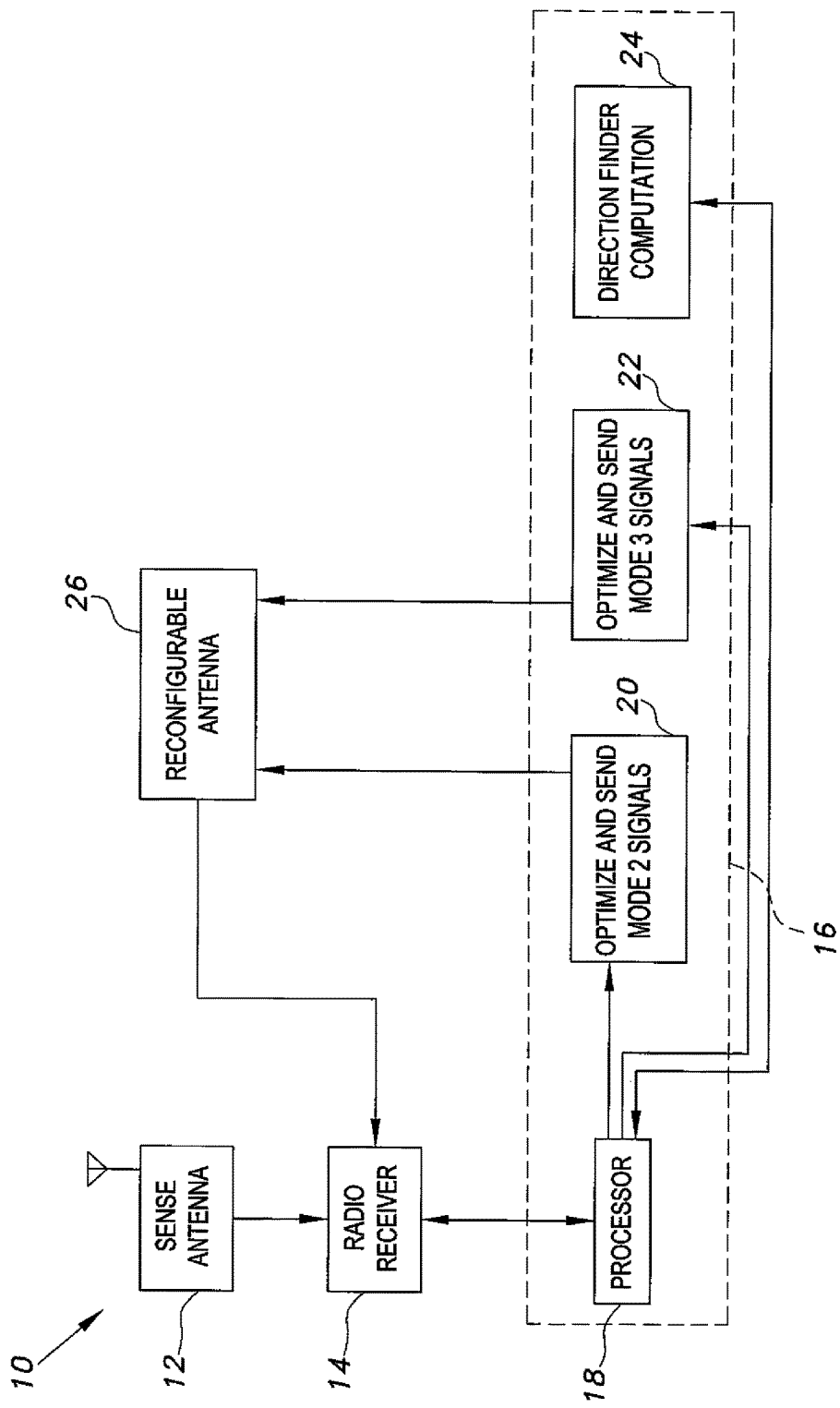
FIG. 1 is a block diagram illustrating an overview of the reconfigurable radio direction finder system and method according to the present invention.

As illustrated in the block diagram of FIG. 1, the reconfigurable radio direction finder system 10 operates in three stages or modes. In the first mode, a receiver senses a radio spectrum and detects signals and their bandwidth via a wideband antenna detection system including a sense antenna 12. Wideband antennas for sensing radio frequency signals and their bandwidths are known in the art, and it should be understood that wideband antenna detection system sense antenna 12 can utilize various suitable types of wideband antennae coupled with a suitable type of radio receiver 14, as can depend on the use or application, for example. The wideband antenna could be a separate wideband antenna or a reconfigurable antenna configured for a wide frequency range operation, for example. The detected signal of interest is initially defined in terms of its frequency range, bandwidth and polarization. This information is fed to a controller 16, which operates as a reconfiguring unit or a system control unit of the system 10. The controller 16 initiates the second stage or mode, in which system 10 dynamically reconfigures a reconfigurable antenna 26 to resonate its operating frequency on the frequency and bandwidth of the signal of interest, and then reconfigure multiple-antenna patterns for a relatively best detection at the polarization state (represented by block 20). It should be understood that the controller 16 and a processor 18 of the controller 16 can be associated with, or incorporated into, any suitable type of computing device, for example, a personal computer, a programmable logic controller (PLC) or an application specific integrated circuit (ASIC).

As will be described in greater detail below, the directional multiple antenna patterns have different pointing directions relative to a pre-defined reference direction. The signals from different antenna states are processed by a direction finder 24 (represented by block 24) to estimate the coarse direction of arrival based on their detected signal power and pointing direction of multiple directional antenna pattern states. This coarse estimation of direction of arrival determines the angular space where the signal is coming from and is used as an input for refined antenna radiation states (i.e., pencil beams) used in the third stage.

The third stage or mode of operation is reconfiguration of beam-widths of multiple pencil beam radiation patterns of the reconfigurable antennas pointing, in angular space, close to the estimated direction in the second stage of the operational mode (represented by block 22). This last stage of reconfiguration refines the estimated direction by using estimated signals from refined third stage narrow beam antenna patterns and their pointing direction (represented by block 24). The more the multiple antenna patterns narrow the beam-width, the greater the relative accuracy with regard to the determined estimation of the direction of signal arrival.

Figure 2:
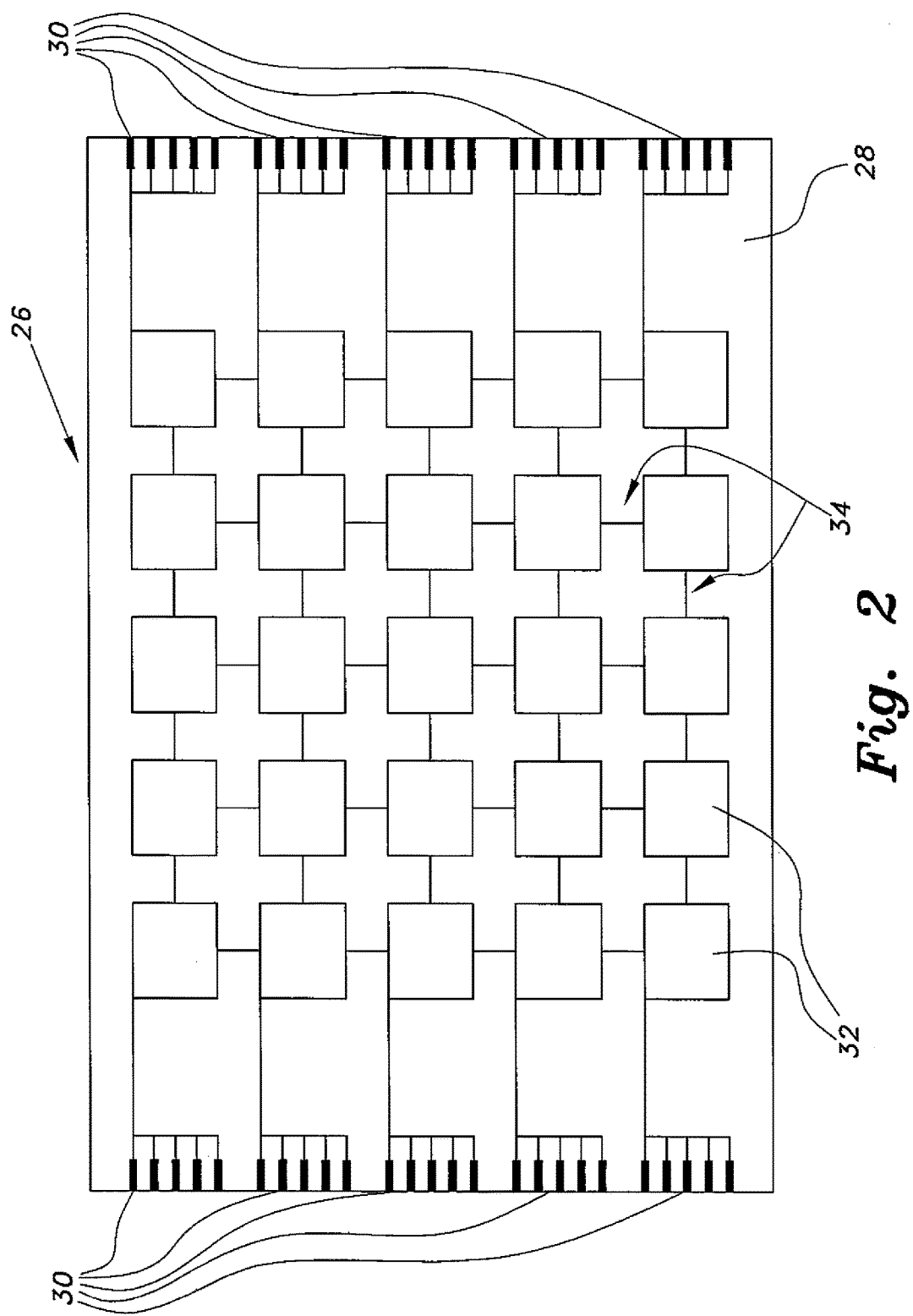
FIG. 2 is a plan view of a reconfigurable antenna of the reconfigurable radio direction finder system according to the present invention.
Figure 3A:
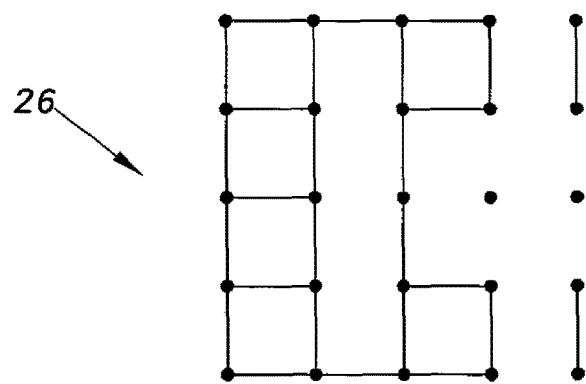
FIG. 3A diagrammatically illustrates an exemplary configuration of the reconfigurable antenna of FIG. 2, configured for an exemplary radio frequency of 9 GHz with a pointing direction of 0°.
Figure 3B:
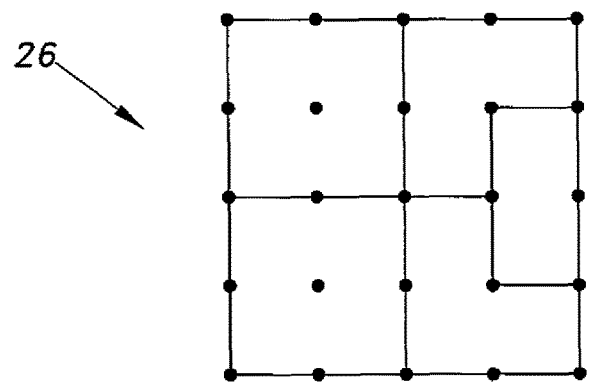
FIG. 3B diagrammatically illustrates an exemplary configuration of the reconfigurable antenna of FIG. 2, configured for an exemplary radio frequency of 9 GHz with a pointing direction of 90°.
Figure 3C:
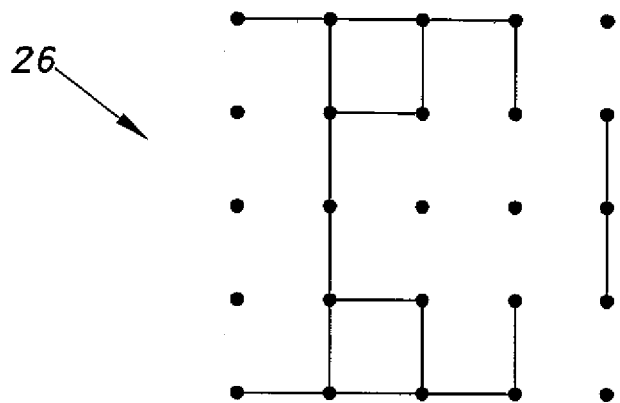
FIG. 3C diagrammatically illustrates an exemplary configuration of the reconfigurable antenna of FIG. 2, configured for an exemplary radio frequency of 9 GHz with a pointing direction of 180°.
Figure 3D:
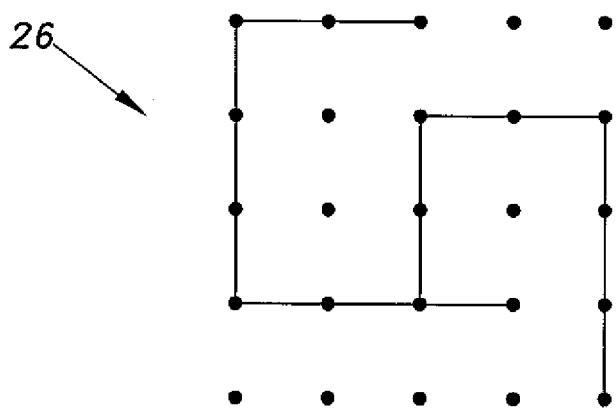
FIG. 3D diagrammatically illustrates an exemplary configuration of the reconfigurable antenna of FIG. 2, configured for an exemplary radio frequency of 9 GHz with a pointing direction of 270°.

The reconfigurable antenna 26 can be formed from an array of patch antennas 32, as shown in FIG. 2, which are positioned on substrate 28 to form a regular rectangular array. Although FIG. 2 illustrates a five-by-five rectangular grid of patches 32, representing 25 "pixels", it should be understood that reconfigurable antenna 26 can use any desired size of antenna grid, as can depend on the use or application, for example. Control signals are fed, from the controller 16, through conventional bias pads 30, which act to open or close radio frequency (RF) field effect transistor (FET) switches 34. As shown in FIG. 2, each pixel or patch 32 of the grid is connected to the adjacent pixels or patches 32 by RF FET switches 34. As shown diagrammatically in FIGS. 3A, 3B, 3C and 3D, by selectively opening or closing chosen switches, the overall geometric configuration of the reconfigurable antenna 26 can be varied in a selectively controlled manner. Each geometry determines a specific current distribution $J(r'_n)$ that leads to a specific antenna radiation state $F''(\theta, \phi)$ that has a particular pointing direction. FIG. 3A shows the reconfigurable antenna 26 configured for an exemplary radio frequency of 9 GHz with a pointing direction of 0°. FIG. 3B shows the reconfigurable antenna 26 configured for an exemplary radio frequency of 9 GHz with a pointing direction of 90°. FIG. 3C shows the reconfigurable antenna 26 configured for an exemplary radio frequency of 9 GHz with a pointing direction of 180°. FIG. 3D shows the reconfigurable antenna 26 configured for an exemplary radio frequency of 9 GHz with a pointing direction of 270°. It should be understood that various suitable types of switching elements can be utilized, such as the RF FET switches 34 described above, as well as other types of active switches, diodes, micro-electromechanical switches (MEMS) or the like, and should not be construed in a limiting sense. The switching process between different antenna modes via different activated and deactivated switches 34 distinguishes the reconfigurable antenna 26 from phased array antennae.

Reconfigurable antenna 26 is capable of working in different frequency bands with different pointing directions of radiation patterns of different beam-widths. As noted above, antenna 26 is a planar antenna using a planar grid of metallic, desirably square-shaped patch antennae, or "pixels", which are interconnected with the switches 34, such as MEM switches, RF FET switches or the like, for example. The combination of activated and deactivated switches 34 determines the geometry of active elements in the planar grid of metallic pixels or patches 32. Each geometric configuration corresponds to a particular characteristic of the antenna radiation pattern state, such as a particular pointing direction. Since the metallic patches 32 which are not connected to the structure, but are still present, must be accounted for in the design process, in order to reach performance goals in the design configuration, electromagnetic (EM) full-wave analysis is used in conjunction with a genetic search algorithm for an optimum configuration that meets design requirements. This can be performed via calculating or determining a relatively large number of candidate configuration designs, for example.

In order to test proper functionality of a selected reconfigurable antenna design, a simulation environment (SE) using an EM full-wave simulator is used to verify the expected performance. The SE has to be able to provide the performance metrics, such as S-parameters, operating frequency and bandwidth, gain and input impedance, etc. The parameters are typically presented in plots that can help evaluation of visually complicated features, such as the surface current of the radiating element, polarization direction, near and far field radiation pattern and the like.

The SE is typically required to predict the interaction between closely spaced elements and the influence of switches and their feed lines of the reconfigurable antenna 26. The switches are modeled properly with differing levels of complexity that depend on required accuracy and available resources of computation, for example. This starts on a basic level by modeling switches as metallic tabs that change their states between "ON" and "OFF". Additional levels of complexity in modeling are required if the switches require electromagnetic circuit simulation. This includes modeling switching diodes and their biasing network, for example.

The optimization of selectively activating and deactivating the switches 34 can allow antenna size reduction while maintaining desired antenna properties. Each combination of activated and deactivated switches 34 typically corresponds to a particular antenna radiation state, for example. The number of possible antenna states depends on the number of switches 34, for example. For N switches, there are $2^N$ antenna states (or configurations). The properties of each of these antenna states are generally unknown at the outset of operation. It can be relatively difficult to find the best or relatively optimal combinations of ON and OFF switches 34 that fulfill design requirements, as it must usually be simulated many times and checked with a design structure. Thus, efficient search algorithms are used to find acceptable reconfigurable antenna states per design requirements. Following the conventional process, the performance of the selected combinations of antenna states are verified with measuring antenna characteristics, as is well known in the field of antenna measurement.

Once the antennae are designed and optimized, the pre-set of combinations of ON-OFF switches 34 are stored in a memory of the system control unit 16 (i.e., processor 18) for both the first and second operational modes. The memory also has stored therein instructions and operations, as described, for implementing and determining a reconfigurable antenna to estimate signal direction of the present method and system of direction finding. Examples of a memory can include computer readable media as can include a magnetic recording apparatus, non-transitory computer readable storage memory, an optical disk, a magneto-optical disk, and/or a semiconductor memory (for example, RAM, ROM, etc.). The system control unit 16 (i.e., processor 18) can send commands to generate radiation patterns of every antenna state or various antenna states at a particular operating frequency. Based on the operation mode, the system control unit 16 sends the one or more commands that correspond to a particular antenna state of a priori known pointing direction and beam-width. These known antenna parameters are tagged with their corresponding measurements of received power of an incoming signal for the direction finding processing.

In the present method of direction finding, which is based on estimation, reconfigurable antennae are used, which can use multiple antenna patterns sequentially. Controller 16 sends different optimum weights to the reconfigurable antenna 26 to change its current distribution, allowing for a particular far field antenna pattern with predefined antenna pattern characteristics, including a pointing direction and particular beam widths in the horizontal and vertical planes that control the directionality level of the antenna pattern, for example.

The reconfigurable antenna system, divides the angular range into N angular spaces. Each angular space is centered with a pointing direction of a particular antenna state. In general, the N angular spaces cover a spherical angular sector defined by horizontal and vertical angular sectors. As the controller or system control unit 16 sequentially sends different weights for optimum antenna states, their corresponding radiation patterns scan particular spherical sectors. The N antenna states typically scan all spherical sectors of interest, for example.

Figure 4A:
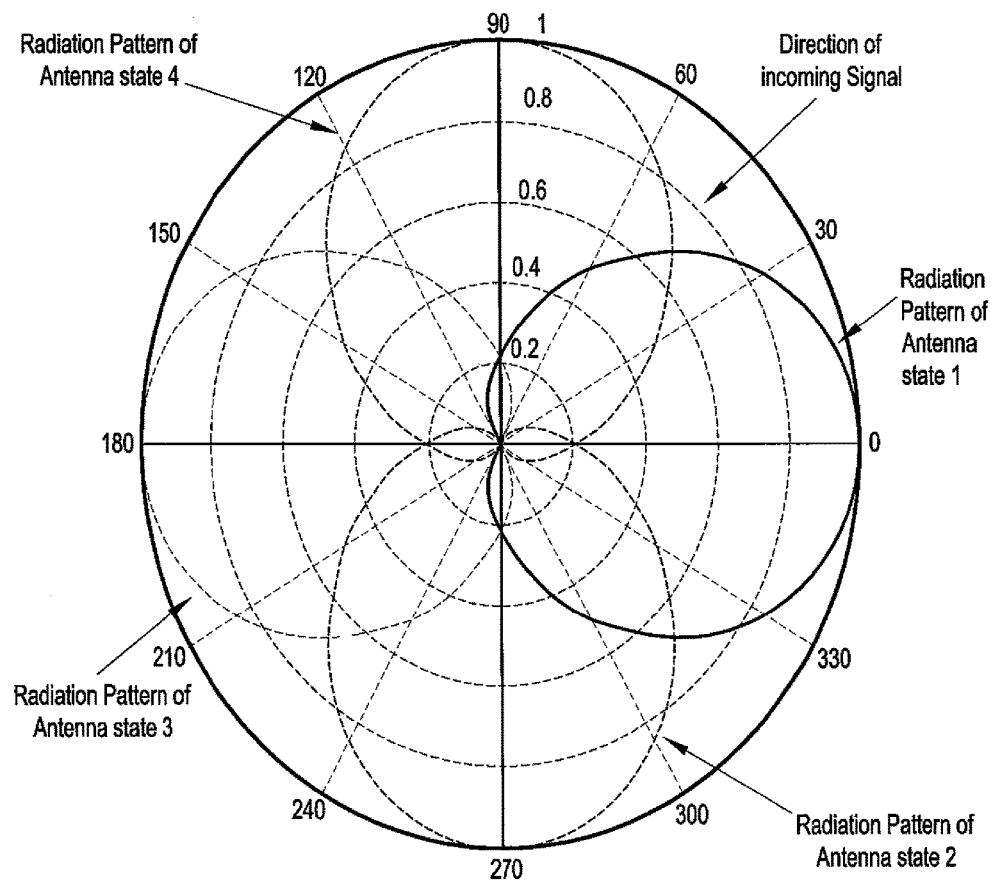
FIG. 4A diagrammatically illustrates four antenna states ($N_1$=4) of a first operating stage of the reconfigurable radio direction finder system pointing in different directions, with a possible direction of an incoming signal.

As illustrated in FIGS. 1 and 2, the controller 16 sends "ON" and "OFF" commands to the switches 34 of the reconfigurable antenna 26, corresponding to an antenna state n. The reconfigurable antenna 26 remains in this desired antenna state n as a sense antenna, in a particular angular space at a specified frequency range, coupled with radio receiver 14 to make received signal strength (RSS) measurements. The controller 16 then sequentially sends further sets of ON and OFF commands to the switches 34, corresponding to another antenna state (state n+1, for example), and the reconfigurable antenna 26 remains in state n+1 while further RSS measurements are made. This process continues until the reconfigurable antenna 26 goes through all or substantially all, or through various, antenna states, and then controller 16 typically can start the operation again. For illustrative purposes, as shown in the example of FIG. 4A, based on the direction of incoming signal, the highest signal level will be what is received from antenna state 1, and then the next level is what is received from antenna state 4. Measurement data from antenna states 2 and 3 is minimal in the example of FIG. 4A. Thus, it is determined that the signal is arriving somewhere between the pointing direction of antenna state 1 and the pointing direction of antenna state 4. How close the estimate is to a particular pointing direction is determined by relative weights of RSS level of each antenna state. This is determined by a spherical weighted direction mean, as described below, which shifts the estimated direction mean toward a proper antenna state pointing direction factor.

Each antenna state interacts with the electric field of the incoming signal differently, due to their different antenna characteristics. The radio receiver 14 measures the RSS of the incoming signal with each antenna state. The RSS of antenna state n is related to a time dependent complex signal, which is given, for example, as a power output $P_n$ of an n-th antenna configuration, such as at a particular time $P_n(t)$, at the local port of the antenna, as follows:

$$P_n(t) = |\oint F^n(\theta,\phi) \cdot E_n(t,\theta,\phi,\Omega) e^{-jk(r_i(t) - V \cdot \Psi(\theta,\phi,\Omega))} d\Omega|^2 \quad (2)$$

where $E_n(t, \theta, \phi, \Omega)$ is the electric field of the plane wave incident on the direction finding reconfigurable antenna 26 in its n-th antenna state, at time t, from the direction of solid angle $\Omega=(\theta, \phi)$, $\theta$ is the elevation angle, $\phi$ is the azimuthal angle, $F^n(\theta, \phi)$ is the far field amplitude of the antenna pattern, k is the wave number $$(i.e., k = \frac{2\pi}{\lambda},$$

where $\lambda$ is the wavelength of the signal), V is the velocity vector of the radio frequency (RF) source terminal, j is the imaginary number, $r_i$ is the distance from the coordinate system's origin of the antenna in its n-th antenna state to the signal source, and $\Psi(\Omega)$ is the arrival direction vector, which, for example, is defined for an incident ray in Cartesian coordinates as follows:

$$\Psi = \cos(\phi)\sin(\theta)\vec{x} + \sin(\phi)\sin(\theta)\vec{y} + \cos(\theta)\vec{z} \quad (3)$$

Using this notation, V is the RF source velocity vector, given by, for example, $V = v_x \vec{x} + v_y \vec{y} + v_z \vec{z}$.

The method of direction finding is based on reconfiguration of the antenna, where the reconfigurable antenna 26 can periodically switch pointing directions of its directional antenna pattern $F^n(\theta, \phi)$ of antenna state n that covers a particular section of a spherical angular space. There are N different antenna states that each have their own pointing direction, given as $F^n(\theta, \phi)$, which is the far field amplitude of antenna pattern state n, whose pointing direction is $(\theta_n, \phi_n)$.

Radio receiver 14 typically makes several measurements for each antenna state and then switches to the next antenna state, eventually making measurements for all or substantially all, or for various, antenna states, and then typically repeating the cycle electronically, for example. The measurement vector for all $N_1$ antenna states, for example, is written as follows:

$$M = \begin{bmatrix} P_1 \\ P_2 \\ P_3 \\ \vdots \\ P_{N_1} \end{bmatrix}, \quad (4)$$

where $P_n$ is the average measurement time series of amplitude of signal measured with receiver 14 while its antenna state is $F^n(\theta, \phi)$.

By comparing the different received RSS values of each antenna state, the system can estimate which angular sector the signal is coming from, relative to the pointing direction of the antenna state. For a fixed direction of arrival, the receive signal amplitude is different from one antenna state to another as a result of a different mean effective gain for each antenna state. The amplitudes are weighted differently as a result of the dot product operation between the electric field of the received signal and $F^n(\theta, \phi)$. This typically results in a different amplitude for the signal of interest with each antenna state. Thus, the known data are the a priori known pointing directions of each antenna state and their corresponding measured powers, which are weighted differently. The antenna state whose pointing direction matches, or is close to, the direction of arrival of the signal of interest would have the relatively largest received power.

In order to estimate the direction of arrival of the signal of interest, the decision is based on two stages of operation. In the first stage of operation, the estimated direction of arrival is at a coarse level to determine the spherical angular space of the incoming signal. In the second stage of operation, the refined and accurate direction of arrival of the incoming signal is provided. During the first stage of operation, the measurement vector $M_1$ is processed while considering spherical properties of the data. Spherical statistics (sometimes referred to as "directional statistics") are used, which differ from linear statistics. Directional statistics are concerned mainly with observations of unit vectors in a plane or three-dimensional space to cover circular or spherical spaces, respectively. In the present method, $N_1$ individual directional measurements are used. At a particular time, measurement $P_n(t)$ and its associated unit direction vector correspond to the pointing direction of a particular antenna state n. This unit vector of antenna state n can be written, for example, as follows:

$$Y_n = \begin{bmatrix} \cos(\phi_n)\sin(\theta_n) \\ \sin(\phi_n)\sin(\theta_n) \\ \cos(\theta_n) \end{bmatrix}. \quad (5)$$

The measured data that correspond to each antenna state can be combined with its known pointing direction, for example, as follows:

$$K_n = P_n Y_n, \quad (6)$$

where the vector $K_n$ can be described by its direction cosines, which represent its components along the three x, y and z Cartesian axes, for example.

The vector $K_n$ contains or represents the proportion of projection of the measured amplitude in the three principal axes. The components of all $K_1, K_2, \ldots, K_{N_1}$ on each axis (X, Y, Z) in Cartesian coordinates, combined together, allows for the computation of the centroid of measured data along each principal axis. The center of gravity of the set of projected measurement data has a mean of the x-coordinate, the y-coordinate and the z-coordinate as follows:

$$X_{1,DF} = \frac{1}{N_1} \sum_{n=1}^{N_1} P_n \cos(\phi_n)\sin(\theta_n); \quad (7a)$$

$$Y_{1,DF} = \frac{1}{N_1} \sum_{n=1}^{N_1} P_n \sin(\phi_n)\sin(\theta_n); \quad (7b)$$

$$Z_{1,DF} = \frac{1}{N_1} \sum_{n=1}^{N_1} P_n \sin(\theta_n). \quad (7c)$$

The azimuthal and elevation angles of direction of the arrival of the signal of interest can then be estimated via the direction of the centroid of the measured data with multiple antenna states of the reconfigurable antenna 26. The coarse elevation angle $\Xi_{CDF}$ and the coarse azimuthal angle $\Phi_{CDF}$ of the signal of interest can be estimated via conversion of the Cartesian coordinates to spherical coordinates, for example, as follows:

$$\Xi_{CDF} = \cos^{-1}\left(\frac{Z_{1,DF}}{\sqrt{(X_{1,DF})^2 + (Y_{1,DF})^2 + (Z_{1,DF})^2}}\right), \text{ and} \quad (8a)$$

$$\Phi_{CDF} = \tan^{-1}\left(\frac{Y_{1,DF}}{X_{1,DF}}\right). \quad (8b)$$

These angles are typically based on conventional spherical coordinates, for example. The range of the elevation angle is from 0 to $\pi$ and the range of the azimuthal angle is from 0 to $2\pi$, for example. The resultant length that comes from the three centroids in the x, y and z axes is related to the dispersion of the measured data estimate. The mean of the resultant length $R_1$ can be computed or determined from its direction cosines, for example, as follows:

$$\overline{R}_1 = \sqrt{(X_{1,DF})^2 + (Y_{1,DF})^2 + (Z_{1,DF})^2}, \quad (9)$$

and the spherical variance of the estimated directional centroids, $\Lambda_{1,DF}$, can be computed or determined, for example, as follows:

$$\Lambda_{1,DF} = 1 - \overline{R}_1. \quad (10)$$

The value of $\Lambda_{1,DF}$ is typically always between zero and one, inclusive, for example.

The estimated direction of arrivals ($\Xi_{DF}$, $\Phi_{DF}$) and estimated uncertainty $\Lambda_{DF}$ are fed to the second stage 22, and are used to generate another set of narrow beam widths of antenna radiation states with the defined angular space by $\Xi_{DF}$, $\Phi_{DF}$ and $\Lambda_{DF}$. These narrow beam widths work like pencil beams for fine and more accurate estimation of the direction finder. This set is of $N_2$ antenna radiation states, and is primarily designed to operate in an angular space related to the coarse estimation of first stage 20.

Figure 4B:
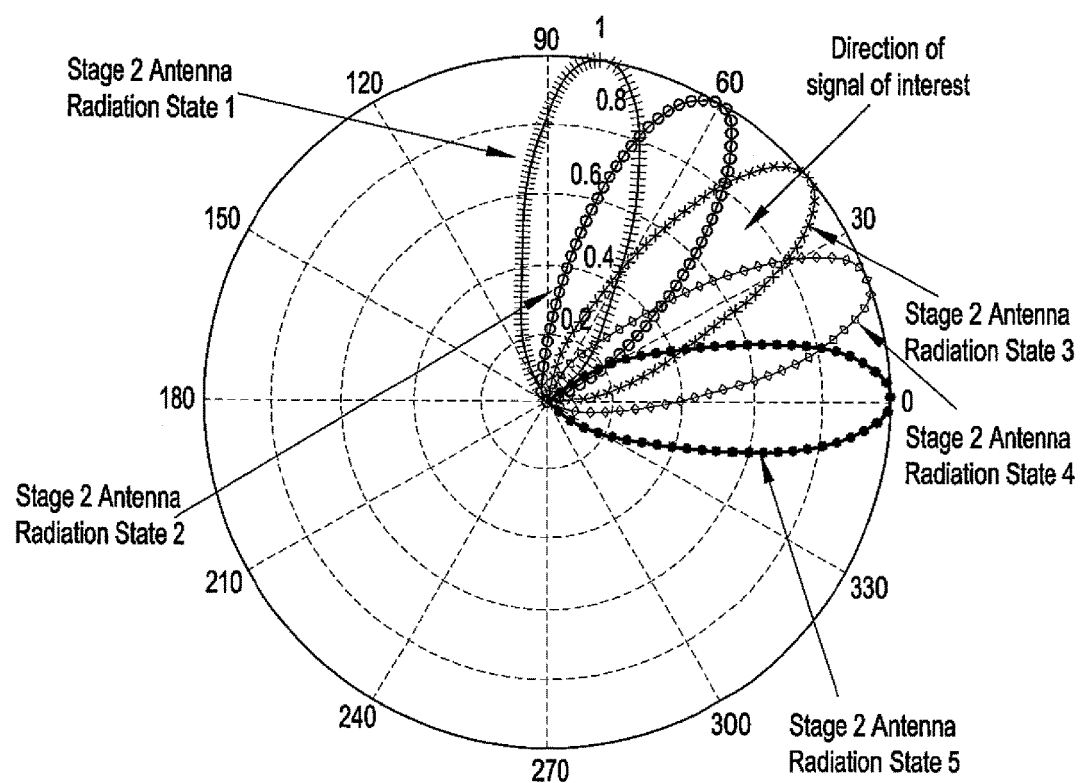
FIG. 4B diagrammatically illustrates four antenna states ($N_2$=5) of a second operating stage of the reconfigurable radio direction finder system pointing in different directions, with a possible direction of an incoming signal.

The new estimated powers for every antenna state during second stage operation cycle through the $N_2$ narrow beam radiation patterns, where the measured powers are used in the direction finder module 24 to estimate a more accurate direction of arrival of the signal of interest, with its uncertainty being described by equations (5) to (10) above, but in terms of the second stage coordinates, $X_{2,DF}$, $Y_{2,DF}$ and $Z_{2,DF}$, and the $N_2$ narrow beam radiation patterns. For illustrative purposes for second stage operation, as shown in the example of FIG. 4B, based on the direction of incoming signal, the highest signal level will be what is received from antenna state 3, then the next level is what is received from antenna state 2, then the next level is what is received from antenna state 4. Measurement data from antenna states 1 and 5 are minimal in the example of FIG. 4B. Thus, it is determined that the signal is arriving somewhere between the pointing direction of antenna state 1 and the pointing direction of antenna state 2 and the pointing direction of antenna state 3. How close the estimate is to a particular pointing direction is determined by relative weights of RSS level of each antenna state. This is determined by a spherical weighted direction mean, as described above, which shifts the estimated direction mean toward a proper antenna state pointing direction factor. Since the highest signal level is associated with antenna state 3 in FIG. 4B, the arriving signal direction is quite close to the pointing direction of narrow beam width of antenna state 3.

It should be noted that the computational cost of the above method is relatively minimal, but the direction finding accuracy depends on the number of antenna states $N_1$ and $N_2$, which can be relatively quite large in a reconfigurable antenna due to the large number of different combinations of optimization switches 34 used by the controller 16 of the system. In order to increase the accuracy of the direction finding system, the system can be configured into two levels of direction finding estimation. In the first level, $N_1$ antenna states can have a relatively wide beam-width that can determine the direction in a relatively coarse fashion. In the second level, the controller 16 sends weights that optimize $N_2$ antenna states that have relatively narrow beam-widths which can allow determination of the direction relatively more precisely than in the first level of antenna states. The two-levels approach typically will have a longer processing time, but the direction finding estimation typically will have relatively greater accuracy.

It is to be understood that the present invention is not limited to the embodiments described above, but encompasses any and all embodiments within the scope of the following claims.

We claim:

1. A reconfigurable radio direction finder system, comprising:
a substrate;
a planar array of patch antennae mounted on the substrate, wherein the planar array of patch antennae are arrayed in a rectangular grid having horizontal rows and vertical columns; and
a plurality of switches connecting each of the patch antennae to horizontally and vertically adjacent ones of the patch antennae to form a reconfigurable antenna, wherein individual ones of said plurality of switches are selectively opened and closed to form a corresponding antenna configuration of the reconfigurable antenna,
wherein the reconfigurable antenna is electronically cycled through N different antenna configurations, where N is an integer greater than one, wherein each said antenna configuration has a pointing direction associated therewith defined by an elevation angle $\theta_n$ of an n-th antenna, where n is an integer between 1 and N, and by an azimuthal angle $\phi_n$ of the n-th antenna, configuration, a set of received signal strength measurements and associated pointing directions being measured and saved such that an estimate of a spherical weighted directional mean vector for a radio signal, $(X_{DF}, Y_{DF}, Z_{DF})$ for first and second operational modes, is estimated as $$X_{DF} = \frac{1}{N}\sum_{n=1}^{N} P_n \cos(\phi_n)\sin(\theta_n),$$

$$Y_{DF} = \frac{1}{N}\sum_{n=1}^{N} P_n \sin(\phi_n)\sin(\theta_n) \text{ and}$$

$$Z_{DF} = \frac{1}{N}\sum_{n=1}^{N} P_n \sin(\theta_n),$$

where $P_n$ is a power output corresponding to a measured, received signal strength of the radio for the n-th antenna configuration.

2. The reconfigurable radio direction finder system as recited in claim 1, wherein each of the switches is a micro-electromechanical switch.

3. The reconfigurable radio direction finder system as recited in claim 1, wherein each of the switches is a radio frequency field effect transistor switch.

4. The reconfigurable radio direction finder system as recited in claim 1, wherein an estimated elevation angle $\Xi_{DF}$ and an estimated azimuthal angle $\Phi_{DF}$ of the radio signal are respectively determined as $$\Xi_{DF} = \cos^{-1}\left(\frac{Z_{DF}}{\sqrt{(X_{DF})^2 + (Y_{DF})^2 + (Z_{DF})^2}}\right) \text{ and}$$

$$\Phi_{DF} = \tan^{-1}\left(\frac{Y_{DF}}{X_{DF}}\right).$$

* * * * *